March 15, 1966 V. L. NEWHOUSE 3,241,124
RANKING MATRIX
Filed July 25, 1961 2 Sheets-Sheet 1
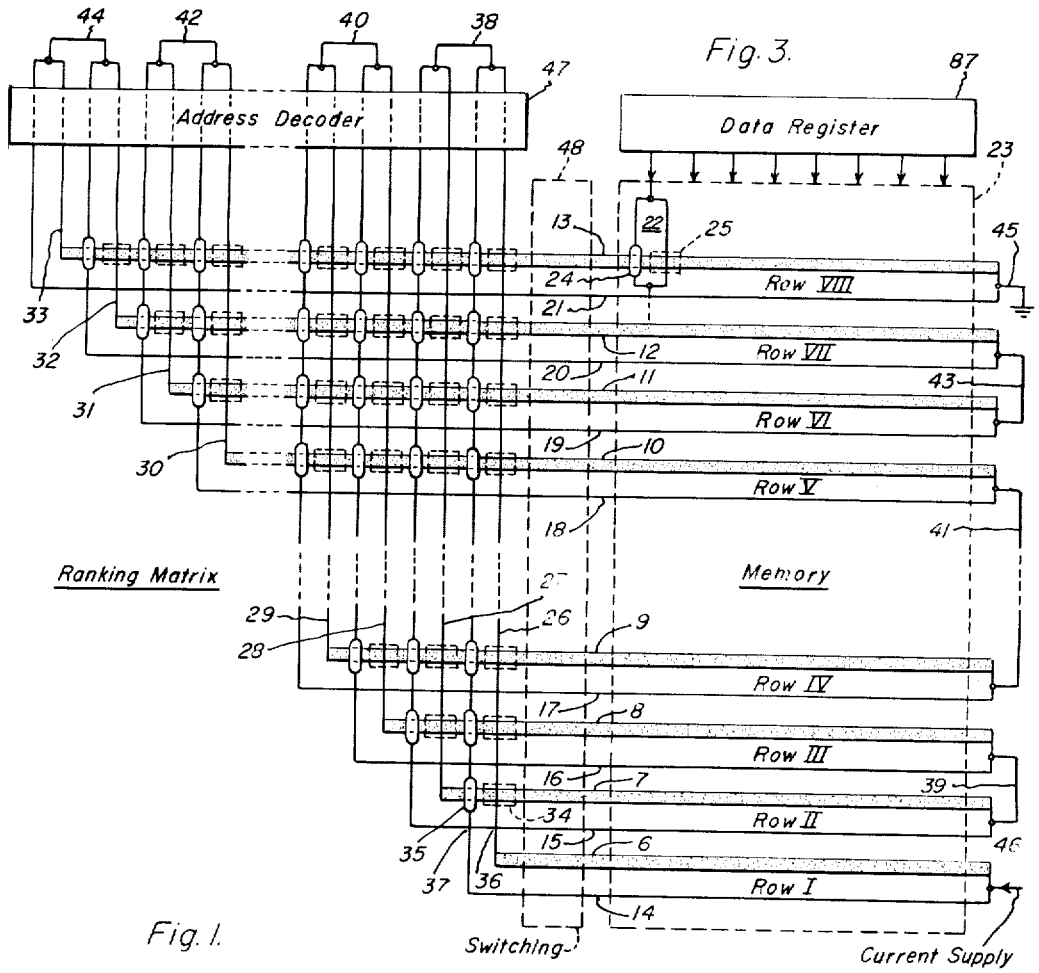
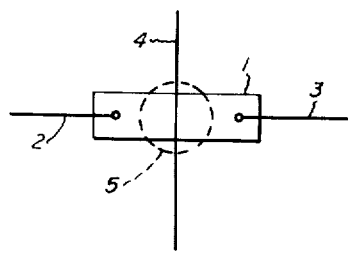
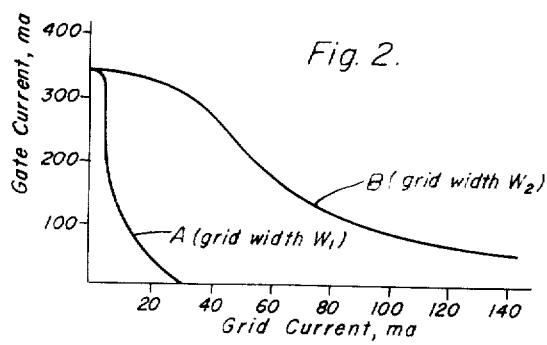
Inventor:
Vernon L. Newhouse,
by John P. Dellett
His Attorney.

March 15, 1966  V. L. NEWHOUSE  3,241,124
RANKING MATRIX
Filed July 25, 1961  2 Sheets-Sheet 2

Inventor:
Vernon L. Newhouse,
by John P. Dellett
His Attorney.

United States Patent Office 3,241,124
Patented Mar. 15, 1966

3,241,124
RANKING MATRIX
Vernon L. Newhouse, Scotia, N.Y., assignor to General Electric Company, a corporation of New York
Filed July 25, 1961, Ser. No. 126,707
15 Claims. (Cl. 340—172.5)

This invention relates to a ranking matrix switching apparatus for immediately selecting one of a plurality of electrical indications and more particularly to such apparatus wherein the first electrical indication is effective to inhibit other indications in a predetermined order.

In the copending application of John W. Bremer and Vernon L. Newhouse, Serial Number 47,539, filed August 4, 1960, abandoned in favor of continuation-in-part application Serial No. 382,692, filed July 8, 1964, now Patent No. 3,182,294, granted May 4, 1965, entitled, "Cryogenic Electronic Memory Unit," which is assigned to the same assignee as the present invention, there is described and claimed a superconducting catalog memory system employing cryogenic electronic devices. These cryogenic electronic devices employ the phenomenon of superconductivity wherein the superconductor loses its electrical resistance at extremely low temperatures near absolute zero. The catalog type of memory device as set forth in the aforementioned application is useful in immediately comparing a digital value with all of the digital values stored in the memory. For example, a stock number for a machine part can be immediately checked against an entire inventory of stock numbers to determine the presence or absence of that machine part in the inventory.

It is frequently useful to know the address of information in such a catalog memory, which information gave rise to a favorable comparison with an interrogation. For example, if digital values corresponding to the inventory in the above example are stored at locations in a catalog memory indicative of the physical location of the corresponding parts, it is useful to determine the address of the location in the memory where the digital value was found, so the part can be located. However, as often occurs, more than one memory location responds to an interrogating quantity.

Resolution of this ambiguity could, for example, necessitate a separate indicating device for each location of a large number of memory locations; however, this expedient is obviously uneconomical. Alternatively, a buffer storage can be provided for indicating, storing and sequencing through a plurality of responsive addresses in the memory. But this solution is relatively time consuming in a system otherwise capable of immediate response, and is also wasteful of components.

It is therefore an object of the present invention to provide an improved apparatus for immediate selecting and indicating one of a plurality of concurrent electrical values.

It is another object of the present invention to provide an improved apparatus wherein all but the first indication of a plurality of electrical indications is inhibited in response to the first of such indications in a predetermined order.

It is another object of the present invention to provide an improved apparatus for quickly and economically handling and indicating, in some order, a plurality of concurrent indications.

In accordance with an illustrated embodiment of the present invention a current selective ranking matrix includes a plurality of indicating conductors and a plurality of control conductors capable of inhibiting current flow in one or more of the indicating conductors. Current flowing in each indicating conductor also flows in a control conductor arranged to inhibit each "subsequent" indicating conductor in some predetermined order. Thus only the first active indicating conductor in a sequence will be capable of maintaining its current, and therefore only the first indication or address of a plurality of indications or addresses will be delivered to an output. The remaining indications can be read out in order after the first is read out, the current on each successive indicating conductor acting to inhibit the current in each further successive or "higher ranking" conductor.

In accordance with another feature of the invention, the respective indicating conductors or lines include cryogenic gate devices, rendered resistive by current in one or more of the control conductors.

In accordance with another feature of the present invention a plurality of indicating means each includes an active superconducting line and a passive superconducting line, wherein presence of a signal is indicated by a current on the active line and an absence of current on the passive line. Each active line is connected in series with a grid conductor for rendering resistive all subsequent active lines in accordance with a predetermined order. A passive line is paralleled across each serial combination of active line and grid conductor for each indicating means. A common current will flow either on the active line or the passive line of each separate indicating means. Such current, however, will flow only on the active line for the lowest ranking indicating means in a predetermined order, and current will be forced to flow on the passive lines for all higher ranking indicating means in a predetermined order because all higher ranking active lines will have been rendered resistive.

In accordance with another feature of the present invention, an address decoder derives a numerical representation of the particular indication among the plurality of possible indications, by detecting the current configuration flowing in the ranking matrix.

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 is a schematic representation of a cryogenic electronic switching device which may be employed in connection with the present invention;

FIG. 2 is a plot of gate current vs. grid current for different cryogenic electronic switching device dimensions, indicative of the combination of such values required to render the device resistive;

FIG. 3 is a schematic diagram of a particular embodiment of the present invention utilizing cryogenic switching devices;

Figure 5:
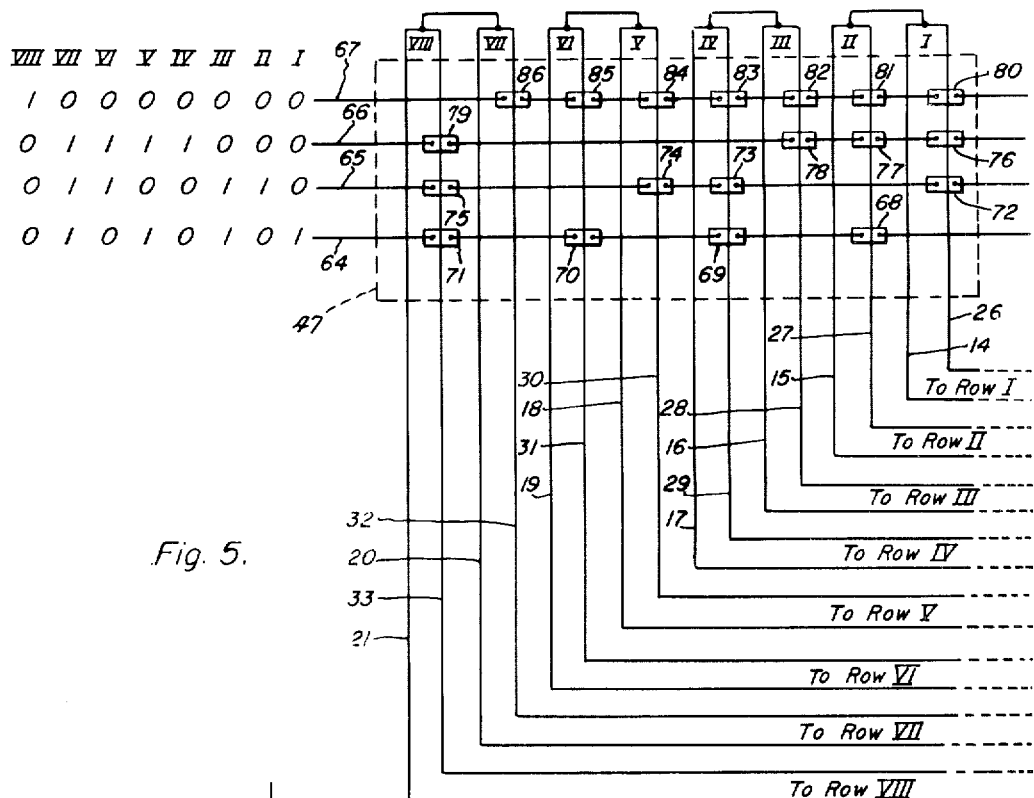
FIG. 5 is a schematic diagram of an address decoder for use with the FIG. 3 embodiment.

Referring to FIG. 1, illustrating a cryogenic electronic switching crossover or crossed film cryotron which may be conveniently utilized in practising the present invention, a first gate or film 1 having end connections 2 and 3 has extended directly thereacross a grid conductor 4 insulated from the gate by means of an insulating layer 5. Each of these conductors is capable of losing all electrical resistance at the operating temperature of the device, near absolute zero. The gate 1 is formed as a thin film of "soft" superconductor while the grid conductor 4 as well as end connections 2 and 3 are formed of relatively "hard"

superconductor material. These terms will be further explained in connection with FIG. 2, which plots gate current vs. grid current necessary in the case of two different cryogenic crossovers, "A" and "B," for rendering the gate conductor resistive. In the case of the curve "A" device, for example, combinations of grid current and gate current to the left of curve "A," will leave the gate 1 superconductive or without electrical resistance when suitably refrigerated; however, for combinations of grid and gate currents to the right of curve "A," gate 1 will become normally resistive due in part to the magnetic field caused by current in grid conductor 4. The curve "A" is for a crossed film cryotron which has a gate 1 of the width $W_1$ equal to 2 mm., which is formed of tin, and which is crossed by a grid conductor 4 formed of lead 30 microns wide. The tin gate material is known as a "soft" superconductor because of its property of regaining electrical resistance at relatively low values of grid current, while lead may be thought of as a relatively "hard" superconductor since grid conductor 4 formed of lead remains superconductive or without resistance throughout the operation of this device despite the presence of its own field. As will be appreciated by those skilled in the art, other well known hard and soft superconductors may be employed in place of the tin and lead materials herein set forth.

The curve "A" device provides a useful switching function in that current in grid 4, traversing a gate 1 having a value to the right of curve "A," can be used to switch the electrical current in the underlying gate. The presence of such a current in grid conductor 4 causes resistance to appear in the gate and this resistance will deter the passage of current in the gate or force it to some alternative superconducting path in response to the said grid current. A cryogenic electronic switching device of this type is described and claimed in the copending application of Vernon L. Newhouse and John W. Bremer, Serial Number 758,474, filed September 2, 1958, now Patent No. 3,076,102 granted January 29, 1963 and assigned to the assignee of the present invention.

The curve "B" in FIG. 2 is for a cryogenic electronic crossover, normally inactive as used in the apparatus of the present invention. The cryogenic crossover giving rise to curve "B" includes an overlying "grid" wire much wider than in the curve "A" instance, i.e., the grid width $W_2$, giving rise to curve "B" is 300 microns. In accordance with the apparatus of the present invention combinations of grid and gate current frequently lie between the two curves so that a curve "B" cryogenic crossover allows the crossing "soft" conductors to remain superconducting, facilitating convenient crossing of superconductors where cyrogenic switching action is not desired. This feature of differentially related superconductor crossovers for providing active and inactive crossings of such superconductors is described and claimed in the copending application of Vernon L. Newhouse and John W. Bremer, Serial Number 78,118, filed December 23, 1960, now abandoned, and entitled, "Cyrogenic Circuitry," which is assigned to the same assignee as the present invention.

A principal consideration which may be noted from FIG. 2 is that physical dimensions of the cryogenic device can be conveniently chosen so that certain specified values of grid and gate current will cause cryogenic switching, while other values may be specified which will not.

Referring to FIG. 3 illustrating a specific cryogenic embodiment of the present invention, a plurality of active indicating lines 6, 7, 8, 9, 10, 11, 12 and 13 provide inputs to the ranking matrix according to the present invention. The active indicating lines may conveniently correspond in width to the "gate" 1 of FIG. 1, i.e., 2 mm. Narrower passive lines 14, 15, 16, 17, 18, 19, 20 and 21 respectively accompany and are connected in a parallel arrangement with the respective active lines. An input "indication" is represented by a current flowing on the active line while current flowing on the adjacent passive line denotes the absence of such indication. This type of signal input characterization is frequently used in cryogenic circuitry wherein source current, derived from a constant current generator, is diverted from one path to another in accordance with input conditions.

All the conductors shown in the FIG. 3 embodiment are superconducting at the temperature of operation near absolute zero. All these conductors may conveniently be formed as deposited thin films on a substrate common to the ranking matrix according to the present invention. Active conductors 6–13 are formed from a "soft" superconductor material and are relatively wider than passive superconductors 14–21, the latter being formed from a "hard" superconductor material. The active superconductors, since they are physically wider, present less inductance and therefore less impedance to the flow of current than the narrower passive superconductors.

The apparatus according to the present invention is useful, inter alia, in selecting indications derived from a catalog-type memory system as described and claimed in the aforementioned copending application of John W. Bremer and Vernon L. Newhouse, Serial Number 47,539. An example of a similar apparatus delivering conjoint "indication" and "no-indication" outputs on pairs of leads is set forth in the copending application of Pierre H. Boucheron, Jr., Serial Number 127,459, filed concurrently herewith, entitled "Data Addressed Memory" and assigned to the assignee of the present invention.

In the Boucheron system, as well as the aforementioned memory unit of John W. Bremer and Vernon L. Newhouse, data digits or "bits" are stored as circulating currents in rows of persistent current loop circuits. Referring to FIG. 3, such a loop circuit is illustrated at 22 in memory 23 which may comprise rows of other loops (not shown). A current of a certain value flowing in the left hand side of loop 22 is conducive of an output "indication," while the occurrence of such current flowing in the right hand side of the loop produces a negative or no indication.

Each side of the loop is formed of "hard" superconducting material, the left hand conductor in the loop being insulated and widened at 24 where it crosses active indicating line 13. This widening corresponds to a width approximately equal to or greater than the width $W_2$ discussed in connection with FIG. 2, but may be conveniently comparable to the width of active indicating line 13. Current flowing in the left hand side of the loop 22, over widened portion 24, will then not render resistive the underlying soft superconducting material forming active indicating conductor 13. A current supplied to the parallel combination of active indicating conductor 13 and its adjacent passive conductor 21 at such time will therefore prefer almost entirely to flow in active indicating line 13 inasmuch as active line 13 possesses less inductance. An indicating current is thereby delivered on line 13.

However, the right hand conductor of loop 22 is narrow where it crosses active indicating line 13, corresponding to width $W_1$ in FIG. 2, and forms a cryotron switching device in the area outlined at 25. Current of a specified value (as conveniently determined between curves A and B in FIG. 2) flowing in the right hand conductor of loop 22 will render resistive the underlying active indicating line 13. A common current then applied in parallel to active line 13 and passive line 21 will be forced to flow in passive line 21 and the absence of an indication from that row in the memory 23 is thereby signified. It is observed that any loop similar to loop 22, overlying active indicating line 13, for example loops in a common row in the memory, will be capable of similarly diverting current to passive line 21.

The present invention is useful to select one of a plurality of indications which selection may occur substantially simultaneously with the said indications. In accordance with the FIG. 3 embodiment of the present invention, active indicating lines 6–13, for example from the memory 23, are respectively serially coupled in the ranking matrix with control conductors 26–33. Each control conductor, formed of hard superconducting material, is disposed in cryotran relation over all "higher ranking" active indicating lines. That is, the control conductor 26, connected in series with active indicating line 6, crosses, in cryotron relation, the active indicating lines serially associated with all control conductors higher numbered than control conductor 26. Thus control conductor 26 crosses active indicating lines 7 through 13 and is narrow with respect thereto while being insulated therefrom so that a current flowing in control conductor 26 will render resistive active indicating lines 7–13. The crossovers where the control conductors overlie active indicating lines in grid relation thereto, whereby they are effective in rendering the lines resistive, are denoted generally by a dotted rectangle enclosing the crossover, for example dotted rectangle 34 where control conductor 26 crosses active indicating line 7. Control conductors have a width corresponding to width $W_1$ in FIG. 2.

In like manner, the next control conductor, 27, overlies all subsequent, that is higher ranking, active indicating lines, i.e. active indicating lines 8–13, etc. It is readily seen that current in any particular active indicating line, and therefore flowing in its serially associated control conductor, will inhibit currents in all higher numbered indicating lines since this current flowing in grid relation over the higher numbered indicating lines will render resistive all higher numbered indicating lines. Therefore one and only one indicating line is capable of remaining in a superconducting state to deliver an "indication."

The control conductors serially associated with particular active indicating lines are conveniently turned sideways to "fold over" higher numbered indicating lines, and their associated passive lines, each successive active indicating line in order being farther extended to allow crossing thereof by lower order control conductors. Also, the passive conductors respectively adjacent each active indicating line are conveniently turned sideways to cross over higher order active indicating lines as well as passive lines; however, passive lines are widened as at 35 where they cross the active lines, to a width which may conveniently correspond to $W_2$ in FIG. 2, so that current flowing in such passive lines will be ineffective to render resistive the underlying active lines. Passive lines are of course insulated from active lines where they cross. Control conductors are insulated from passive lines where they cross, for example, control conductor 26 is insulated from passive line 15 at 36, but no cryogenic switching action can take place at 36 since both conductors are narrow and both are formed of "hard" superconducting material. Similarly, passive lines are insulated from subsequent higher numbered passive lines where they cross, for example, passive line 14 is insulated from passive line 15 where they cross at 37, but again no cryogenic action will take place inasmuch as both passive lines are narrow and both are formed of "hard" superconducting material.

Each series combination of an active indicating line and its associated control conductor may be further connected in series with other active indicating lines and control conductors. Thus, active indicating line 6 in series with control conudctor 26 is further connected at 38 to control conductor 27 and active line 7. Active line 7 is coupled to active line 8 at 39. Similarly, control conductor 28 is coupled to control conductor 29 at 40, active line 9 is connected to active line 10 at 41, control conductor 30 connects to control conductor 31 at 42, active line 11 is coupled to active line 12 at 43, and control conductor 32 connects to control conductor 33 at 44. The remaining end of active indicating line 13 may be conveniently grounded at 45 while the remaining end of active indicating line 6 is available at 46 for application of a supply current thereto.

The passive conductor adjacent each active line, which may be associated therewith in each memory row, is paralleled across the combination of that active line and its series related control conductor. Thus passive line 14 is disposed between points 38 and 46, passive line 15 is disposed between points 38 and 39, etc.

As appears, parallel combinations comprising a passive line, and a series combination of the adjacent active line with its associated control conductor, extend across the memory 23 and the ranking matrix. Such parallel combinations are joined in sequential order on opposite sides of the system, first on the remote side of the memory and then on the remote side of the ranking matrix, whereby an overall series circuit is formed. A common compare current applied at 46 will therefore be applied simultaneously to all active and passive lines in the common overall series circuit. This grid current should lie between curves "A" and "B" of FIG. 2, whereby "$W_1$" crossovers are effective for switching while "$W_2$" crossovers are not. The above arrangement has an advantage of convenience in connection and joint utilization of a source of current; however, it will be appreciated that other source arrangements, for example other serial arangements of the paralleled active and passive lines may be similarly employed.

Address decoder 47 is conveniently disposed across the active and passive lines to determine the numerical address in binary notation of the one lowest ranking input of a plurality of inputs indicated on active lines 6–13. This type of address decoder will be subsequently described in greater detail. Address decoder 47 will be described more fully in connection with FIG. 5. A switching arrangement 48 may also be conveniently disposed over these active and passive lines to permit switching and access to a memory address indicated. The latter feature is described and claimed in the copending application of Pierre H. Boucheron, Jr., Serial Number 127,459 filed concurrently herewith for "Data Addressed Memory" and assigned to the assignee of the present invention.

In operation, the apparatus of FIG. 3 acts to suppress current on all but the lowest ranking of a plurality of inputs on a plurality of "active" input lines. A current applied at 46 will tend to follow the lower inductance active lines wherever such a current flow is not inhibited by some means preventing an indication on the active line. For example, current will tend to flow in an active line when the active line does not have current inhibited therein by a current flowing in cryotron relation thereover in a cell or loop of a memory row. When current flow is inhibited in the active line, such current will be diverted to the parallel passive line, signifying no indication. In accordance with the present invention, if two or more active lines attempt to carry current, the control conductor in series with the lower ranking active line, disposed in cryotron grid relation over the higher ranking active line, will render resistive the higher ranking active line; therefore one and only one initial address will result at decoder 47, i.e., that of the lower ranking active line. Therefore, the address decoder need deal with only one address at a time, and is therefore able to immediately deliver that first address.

After the first or lower ranking address is thus indicated, the input on the lowest ranking active ranking line can be disabled, as by rendering the active line resistive with switching means 48, or alternatively by withdrawing or cancelling the stored information in the addressed row in the memory 23. Then the current supply is re-applied at 46 resulting in production of an address at address decoder 47 corresponding to the next higher ranking active line.

The FIG. 3 ranking matrix is illustrated as receiving eight separate inputs from an eight row memory as a matter of illustrative convenience. It is appreciated a lesser number of inputs may be involved, or a greater number as implied by the broken lines between lines 9 and 18 in FIG. 3. Also individual cryotrons in series may be substituted for widened indicating lines 6–13.

In such an arrangement it is sometimes desirable to make paralleled passive lines 14–21 somewhat longer or to take other steps so they retain their status as alternative higher impedance paths.

Figure 4:
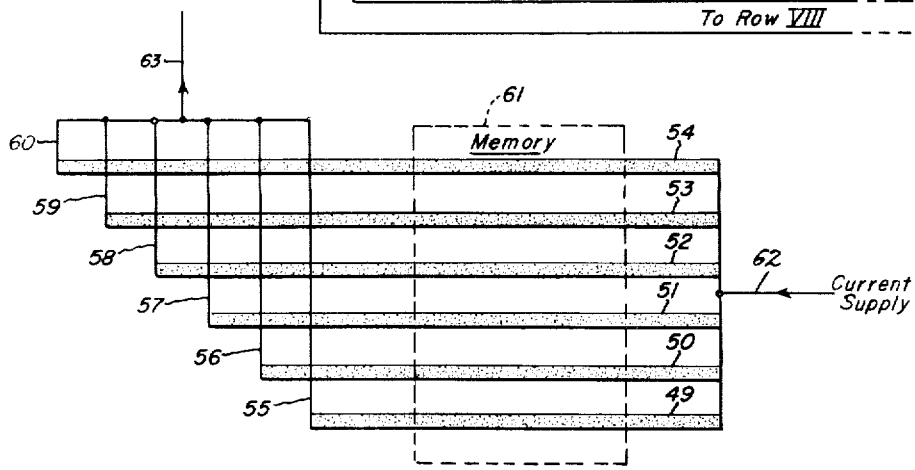
FIG. 4 is a schematic representation of another embodiment of the present invention.

FIG. 4 illustrates a somewhat simplified embodiment in accordance with the present invention. The embodiment of FIG. 4, while being more critical of current adjustment than the previous embodiment hereinbefore described, and while having a slower time constant, nonetheless offers significant advantages in the circuit simplification where large numbers of superconductors are to be disposed in a limited area. Again all conductors are superconducting at the operating temperature of the apparatus, near absolute zero. Active indicating lines 49, 50, 51, 52, 53 and 54 are formed from "soft" superconducting material, while the other superconductors shown, for example, control conductors 55, 56, 57, 58, 59 and 60, are "hard" superconducting material. An input to the ranking matrix is indicated by current flow in one of the active indicating lines 49–54, that is by the tendency of one of such lines to carry a current by residing in a superconducting state. Such inputs may be determined for example by current inhibiting means as in a memory 61, similar in nature to the means described in connection with the previous embodiment. First ends of each of the superconducting active indicating lines 49–54 are connected together to provide a common input for current supply at 62. Control conductors 55–60 are serially associated with the respective active lines 49–54 and are conveniently turned sideways where they join the respective active lines so they cross or overlie subsequent or higher ranking active lines, the end of each successive active line in order being further extended such that each lower order control conductor may conveniently cross thereover. Each control conductor is insulated from the active lines it crosses and is narrow with respect thereto to provide cryogenic switching action for rendering the underlying active line resistive. Control conductors 55–60 are connected together as at 63 to provide a common current supply return.

In operation the FIG. 4 apparatus acts to suppress current on all but the lowest ranking or lowest numbered active indicating lines of lines 49–54. Assuming more than one of these active lines is initially in a superconducting state, the current on the lower ranking line flowing through its associated control conductor will inhibit current on the higher ranking lines by cryotron action. It is understood an address decoder, or other convenient means may be provided for detecting the active line which ultimately carries the entire current supply.

Address decoder 47 illustrated in FIG. 5 is a circuit means for delivering a convenient numerical representation of a particular single input indication detected by the apparatus shown in FIG. 3. The decoder shown is for eight inputs; it is appreciated a larger decoder might be employed with a larger memory or input device. The decoder conveniently includes superconducting lines 64, 65, 66 and 67 each of which may have a source of current applied thereto (not shown). Line 64 corresponds to the lowest ranking digit in a binary sequence, and a current will flow unimpeded by resistance in line 64 if the lowest ranking digit of the binary sequence is indicated. In like manner lines 65, 66 and 67, if they remain superconducting indicate the presence of second, third and fourth binary digits. Line 64 includes cryotron gates 68 through 71 which are traversed in grid relation by the control conductors 27, 29, 31 and 33 connected to inputs from rows II, IV, VI and VIII of the memory matrix 23 of FIG. 3. Line 65 serially includes cryotron gates 72–75 traversed in grid relation by the respective control conductors for inputs from rows I, IV, V and VIII of the memory matrix. Line 66 serially includes cryotron gates 76–79 traversed in grid relation by the control conductors for rows I–III and VIII of the memory matrix. Likewise line 67 serially includes cryotron gates 80–86 traversed in grid relation by the control conductors from rows I–VII of the memory matrix.

The decoder functions to deliver the parallel binary address on lines 64–67 corresponding to the number of an input "indication" or row in the memory matrix which delivers such "indication." To the left of lines 64–67 in FIG. 5 is a "truth table" giving resultant binary values presented on the respective lines responsive to the inputs from the different rows in the memory matrix. A "one" represents a current in the corresponding line, i.e., a superconducting line, while a zero indicates the opposite, i.e., no current. It is observed the decoder of FIG. 5 is arranged with cryotrons which are serially included in the various superconducting lines being positioned under control conductors in a matrix corresponding to the positions of zeros in the truth table. Therefore a current on the single selected active control conductor prevents current flow in all decoder superconducting lines except the line or lines indicative of a digit in the binary address corresponding to that control conductor. The latter line or lines are left superconducting.

By way of example, consider the situation where row II in the memory matrix provides the input. The current flows in control conductor 27 for row II inhibiting current flow in first digit line 64 by rendering resistive cryotron gate 68. Also, cryotron gates 77 and 81 are similarly rendered resistive. However, no cryotron gate in line 65 is rendered resistive and therefore a current may flow in line 65, the line corresponding to the second binary position, thereby indicating the binary address, 2, (0010) for row II in the memory matrix. It is observed that a binary 15 (all ones) represents the absence of an input indication.

As suggested, the present invention is useful in selecting indications from a catalog memory as set forth in the aforementioned copending application of John W. Bremer and Vernon L. Newhouse. In the catalog memory a binary input value or "interrogation" is compared simultaneously with a large number of memory locations or rows. The interrogation may be entered into the data register 87 in FIG. 3 for comparison with the rows of memory 23. If one such location or row contains a series of binary digits corresponding to the binary interrogation, an output signal results. The output signal may be arranged to indicate the "address" of the memory location giving rise to favorable comparison. However, if more than one memory location corresponds to the interrogation, an ambiguous or incorrect output ordinarily would result. According to the present invention, the ambiguity of a plurality of simultaneous indications on separate conductors from plural memory locations is suppressed by using lower ranking indications of comparison to inhibit higher ranking locations in a predetermined order. The result is a single "first" indication which may be appropriately decoded to denote the address of such location which stores the comparing data. This comparing location may then be cleared or cancelled after which the interrogation may be repeated to recover the address of the next comparing location in a predetermined order.

A principal feature of the data addressed memory described and claimed in the aforementioned Boucheron application, filed concurrently herewith, is the retrieval of data from a memory when its address in memory is unknown, but where related data, which may be stored at the same address, is known. No memory searching or scanning of addresses is required to retrieve information. The related fact or tag will ordinarily be the result of a previous computation in a computer, or will be initially available in a data retrieval system. The exact address of a data block in this memory is of little consequence. Information may be detected and data entered into and withdrawn from the memory non-destructively without regard to its physical location. Read out of data can be immediate in this type of system permitting "on-line" operation. However, on-line operation must avoid confusion engendered by possible plural responses or plural outputs responding to a particular "tag" or interrogation. The ranking matrix according to the present invention may be utilized to avoid this ambiguity in that only the first of such memory locations, according to a predetermined order, will be immediately read out.

Referring to FIG. 3, which may be used to illustrate data-addressed type memory operation, a partial block of data designated as a "fact A" can be entered into the data register 87. This "fact A" may then be compared with "fact A" portions of each row of a plurality of horizontal memory rows to indicate any row storing an identical fact A portion. Then the entire data block, for example comprising fact A and other facts, B, stored in that row, is immediately read out via switching arrangement 48. Reference is made to the aforementioned Boucheron application, setting forth and claiming this type of system, for a detailed description thereof.

It is also possible to recover comparing data, if desired, employing a catalog memory and the ranking matrix according to the present invention together with a conventional random access memory which stores data identical to that stored in the catalog memory and at identically addressed locations. When apparatus in accordance with the present invention delivers the single "first" address of comparing data in the catalog memory, this same address can be used to recover the data from the random access memory. It is therefore possible to employ this arrangement in a data-addressed type system where interrogation of the catalog memory is by partial content. After comparing data is found, addressing the random access memory recovers related facts stored at the corresponding address. Thus if an interrogation is by stock number of an item in an inventory, addressing the random access memory can be arranged to recover a warehouse location of such item, this warehouse location information being stored conjointly with the stock number at one address in the random access memory.

The ranking matrix according to the present invention is not in any way limited in its usefulness to memory systems. It is merely convenient to illustrate the present invention in connection with an example "source" of input indications.

While the ranking matrix in accordance with the present invention is illustrated as employing cryogenic switching devices and while the ranking matrix is of particular use in taking advantage of the speed capabilities of cryogenic switching elements, it is understood the present invention is not restricted to cryogenic devices and may employ other types of circuit elements, for example, more conventional switching elements.

While I have shown and described several embodiments of my invention, it will be apparent to those skilled in the art that many other changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A ranking apparatus for indicating the first of a plurality of circuit responses according to a predetermined order comprising coupling means for signalling said responses wherein the coupling means corresponding to the first response according to said predetermined order is effective to inhibit other coupling means so that the first response according to said predetermined order is the only one indicated.

2. A ranking apparatus comprising a plurality of coupling means any one of which may be responsive for coupling an indication, each of said coupling means inhibiting all other coupling means subsequent thereto in a predetermined order so that only one response is initially indicated.

3. A ranking matrix comprising a plurality of superconducting lines each of which may carry an indicating current, control conductors in series with said superconducting lines and cooperating with other superconducting lines subsequent in a predetermined order to render resistive said subsequent lines.

4. A ranking martix comprising a plurality of superconducting lines each capable of carrying an indicating current and a plurality of corresponding control conductors interconnected with said superconducting lines and having a superposed relation to subsequent superconducting lines according to a predetermined order so that an indicating current in a first of said superconducting lines causes the corresponding control conductor to render resistive all subsequent superconducting lines according to said predetermined order.

5. A ranking martix comprising a plurality of corresponding active and passive superconducting lines wherein current on an active line is indicative of information corresponding thereto, and a plurality of serially related grid conductors also serially related with one of said active lines and superposed with respect to subsequent active lines in accordance with a predetermined order so that current in the first active line according to the predetermined order diverts current to the corresponding passive line.

6. The apparatus as set forth in claim 5 wherein the said active lines are of lower inductance than said corresponding passive lines so that a supercurrent prefers a said active line in the absence of a grid current flowing thereover in one of said grid conductors.

7. The apparatus as set forth in claim 5 wherein the said active lines are formed as strips of "soft" superconducting material having a greater width than said passive line and said control conductors.

8. A ranking martix comprising a plurality of corresponding parallel active and passive superconducting lines wherein current on an active line is indicative of information coresponding thereto, a plurality of serially related grid conductors each also serially related with one of said active lines and superposed with respect to subsequent active lines in accordance with a predetermined order so that current in the first active line according to the predetermined order diverts current to the corresponding passive line, and a serial circuit joining parallel pairs of said active and passive lines and said grid conductors to provide a complete superconducting circuit.

9. The apparatus as set forth in claim 8 further including a register for indicating the address of the said first active line according to said predetermined order.

10. A ranking matrix comprising a plurality of superconducting lines each capable of carrying an indicating current, a plurality of corresponding control conductors each connected in series with one of said superconducting lines and having a superposed relationship to subsequent superconducting lines according to a predetermined order so that an indicating current in a first of said superconducting lines causes the corresponding control conductor to render resistive all subsequent superconducting lines according to said predetermined order, and circuit means connecting in parallel the combinations of each superconducting line and its serially connected control conductor.

11. The apparatus as set forth in claim 10 wherein the said active lines are formed as strips of "soft" superconducting material having a greater width than said passive lines and said control conductors.

12. A ranking matrix comprising a plurality of corresponding parallel active and passive superconducting lines wherein current on an active line is indicative of information corresponding thereto, a grid conductor included in series with each active line and superposed with respect to subsequent active lines in accordance with a predetermined order so that a current in the first active line flowing through said grid conductor inhibits current flowing in the subsequent active lines, a return conductor included in series with each passive line connecting the remote end of each grid conductor with said corresponding passive line to complete a parallel circuit, and circuit means for connecting in series the parallel combinations of said active and passive lines.

13. A ranking matrix comprising a plurality of corresponding active and passive superconducting lines, a plurality of grid conductors each one of which is serially connected to the end of one of said active lines and turned sideways with respect thereto, the said end of each successive active line in order being farther extended in the direction of said end such that each grid conductor crosses an extended portion of each subsequent active line in order, and return conductors joining the remote end of each said grid conductor with a passive line.

14. Apparatus for retrieving data comprising a catalog memory for storing data in memory locations, means for comparing an interrogation with contents of said catalog memory locations to produce a response indicative of comparing locations, switching means for selecting one of said locations and providing the address thereof, and a random access memory for storing corresponding data at locations corresponding to the locations of said catalog memory wherein said random accesss memory is addressed with said address to recover data corresponding to said interrogation.

15. The apparatus set forth in claim 14 wherein said switching means comprises circuitry for receiving a plurality of input indications including means for inhibiting all such input indications except a first such input indication according to a predetermined order.

References Cited by the Examiner

UNITED STATES PATENTS

| | | | |
|---|---|---|---|
| 2,960,683 | 11/1960 | Gregory et al. | 340—172.5 |
| 2,968,794 | 1/1961 | Slade | 340—173.1 |
| 2,997,692 | 8/1961 | Lamey | 340—146.2 |
| 3,001,178 | 9/1961 | Buck | 340—173.1 |
| 3,008,129 | 11/1961 | Katz | 340—172.5 |
| 3,011,151 | 11/1961 | Ketchledge | 340—146.2 |

OTHER REFERENCES

Pages 106–121, April 1961, Kiseda et al., A Magnetic Associative Memory, IBM Journal.

ROBERT C. BAILEY, *Primary Examiner.*

MALCOLM A. MORRISON, *Examiner.*